United States Patent

Cushman

[15] 3,694,631
[45] Sept. 26, 1972

[54] TWO-RESOLVER, STRAPPED-DOWN INERTIAL REFERENCE SYSTEM

[72] Inventor: Paul G. Cushman, 134 Mountain Drive, Pittsfield, Mass. 01201

[73] Assignee: General Electric Company

[22] Filed: Dec. 30, 1969

[21] Appl. No.: 889,161

[52] U.S. Cl. ............................235/150.25, 235/186
[51] Int. Cl. ............................G06g 7/78, B06g 7/22
[58] Field of Search.........235/150.25, 150.27, 150.3, 235/186; 33/204, 226; 318/580

[56] References Cited

UNITED STATES PATENTS

| | | |
|---|---|---|
| 3,351,276 | 11/1967 | Weikert.........235/150.25 UX |
| 3,310,876 | 3/1967 | Yamron............235/150.25 X |
| 3,087,333 | 4/1963 | Newell..............235/150.25 X |
| 3,284,617 | 11/1966 | Lerman................235/150.25 |
| 3,231,726 | 1/1966 | Williamson...........235/150.25 |
| 3,412,239 | 11/1968 | Seliger et al..........235/150.25 |

Primary Examiner—Eugene G. Botz
Assistant Examiner—Jerry Smith
Attorney—Frank L. Neuhauser, Oscar B. Waddell, Joseph B. Forman, Francis K. Richwine and Carl W. Baker

[57] ABSTRACT

The strapped-down reference system attains the equivalence of a three- and four-gimbal, inertial reference system by using a forward resolver chain, which can be of relatively low accuracy, to derive gimbal angle values, and high-accuracy feedback resolvers to derive signals to cage the gyroscopes. The gyroscopes are caged by pulse torque techniques and integration of angular rates is performed in an essentially digital fashion by pulse generators and stepping motors.

7 Claims, 5 Drawing Figures

INVENTOR
PAUL G. CUSHMAN

BY *J.F. McDevitt*
HIS ATTORNEY

INVENTOR
PAUL G. CUSHMAN
BY J F McDevitt
HIS ATTORNEY

INVENTOR
PAUL G. CUSHMAN
BY J.F. McDevitt
HIS ATTORNEY

TWO-RESOLVER, STRAPPED-DOWN INERTIAL REFERENCE SYSTEM

BACKGROUND OF THE INVENTION

1. Field of the Invention

This invention relates to a strapped-down inertial reference system, and more particularly to a novel two-resolution strapped-down inertial reference system.

2. Description of the Prior Art

Analog, strapped-down attitude reference systems have recently been of serious interest for use in missiles and space vehicles, although they are also useful for other navigation and vehicle control functions as well. Strapped-down systems are particularly useful because there is frequently insufficient room in these vehicles for a gimballed system. Analog systems are desirable for their relative simplicity and because there is no need for the complexity of a digital computer.

It is frequently required that such systems be radiation hardened, and this is difficult with simple digital computers and with some analog elements, particularly those, such as electronic integrators, which use capacitors for storage.

SUMMARY OF THE INVENTION

The present invention meets the above-cited requirements by caging the gyroscopes to the body by means of pulse torquing in which the caging loops involve two separate resolutions. When the body rotates, the gyroscopes generate small error signals which are resolved to equivalent gimbal coordinate signals in a first, possibly relatively crude, resolver chain. When a particular equivalent gimbal error signal reaches a threshold value, it causes a precision pulse generator to generate a gimbal angle pulse. This gimbal angle pulse advances a stepping motor or equivalent device through one increment of gimbal angle, thereby adjusting the angle of the associated resolvers. The gimbal angle pulse is also passed through a second, precise, feedback resolver chain to torque amplifiers to generate torquing pulses to cage the gyroscopes.

In the system described above, the elements of the forward error channel (i.e. the first resolver chain, the threshold detectors, and the pulse shape applied to the stepping motors) do not require critical accuracy. Critical accuracy is required by elements of the feedback channel (i.e. presicion pulse generators, feedback resolver chain, gyroscope torquers and torque amplifiers).

DESCRIPTION OF THE PREFERRED EMBODIMENTS

Figure 1:
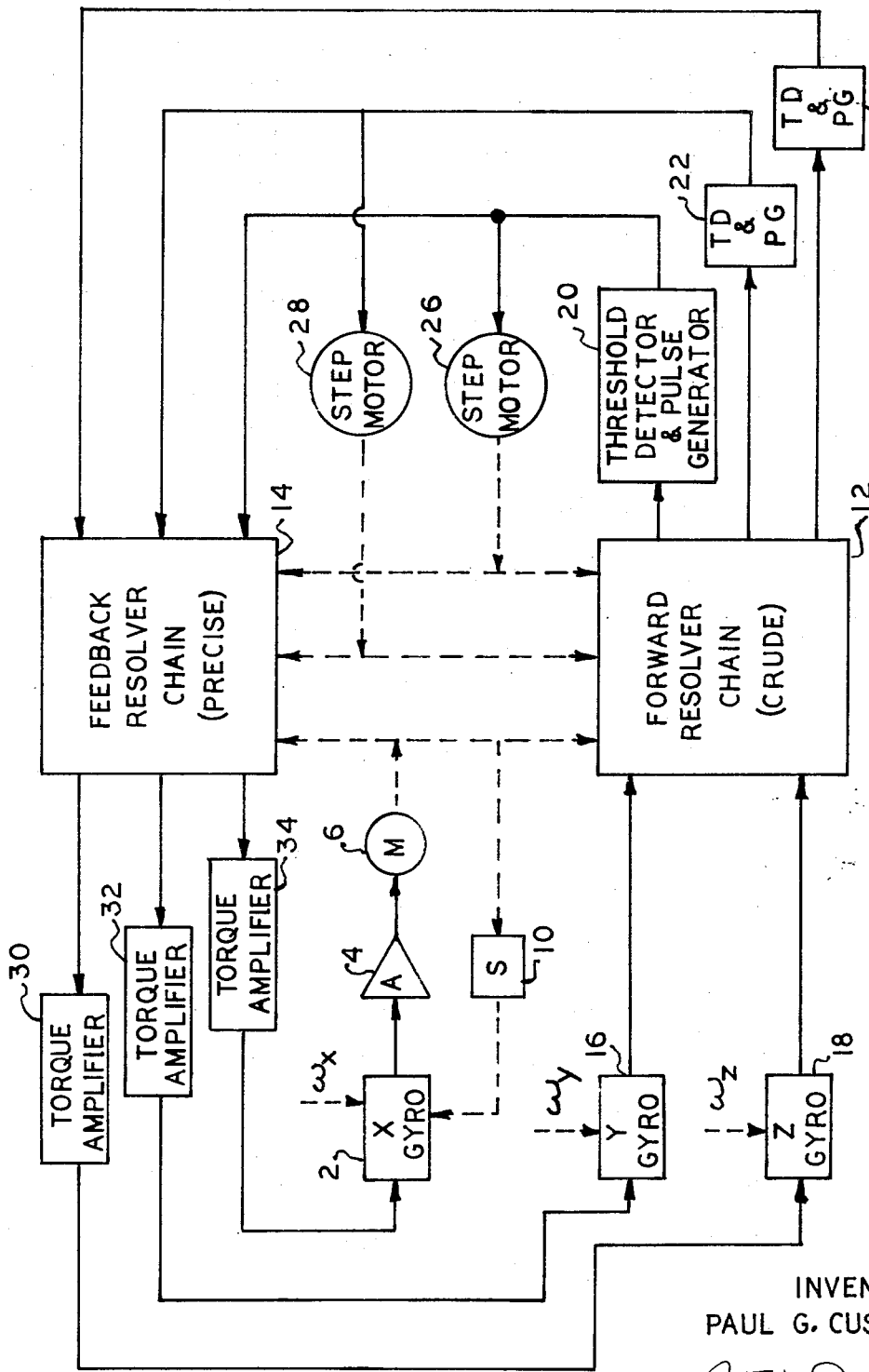
FIG. 1 is a schematic block diagram of an overall equivalent three-gimbal strapped-down system.

FIG. 1 is an overall schematic block diagram of a three-gimbal system according to the present invention. As will be seen from the equation presented below for both the three-gimbal configuration and the four-gimbal configuration, one part of the caging signal for the $X$ gyroscope 2 is handled by a single-axis platform comprising a motor amplifier 4, and a servo-motor 6 which repositions the $X$ gyroscope mechanically. A feedback drive arrangement 10 is provided wherein the servo motor can drive the gyroscope directly as in a one-speed drive or through a gear train. Thus, when the body on which the strapped-down system is mounted begins to rotate at a $\omega_x$, the single-axis platform aids in the caging of the $X$ gyroscope 2. The single-axis platform also drives the forward resolver chain 12 and the feedback resolver chain 14.

Rotations $\omega_\gamma$ which affect the $X$ gyroscope 16 and rotations $\omega_z$ which affect the $Z$ gyroscope 18 cause these gyroscopes to send gyroscope error signals directly to the forward resolver chain 12. Three gimbal angle signals are derived from the resolver chain 12 on three channels and are applied respectively to three threshold-detector and pulse-generator systems 20, 22 and 24.

The pulses from generators 20 and 22 are respectively applied to stepping motors 26 and 28 to further control the two resolver chains. The stepping motors can drive the resolver chains directly as in a one speed drive or through a gear train. The pulses from all three generators are applied to the feedback resolver chain 14 to derive gyroscope torquing signals in three channels, which are respectively applied to three torque amplifiers 30, 32 and 34 to amplify the torsion control signals. These signals are then applied to control the repositioning of the gyroscope.

Figure 2:
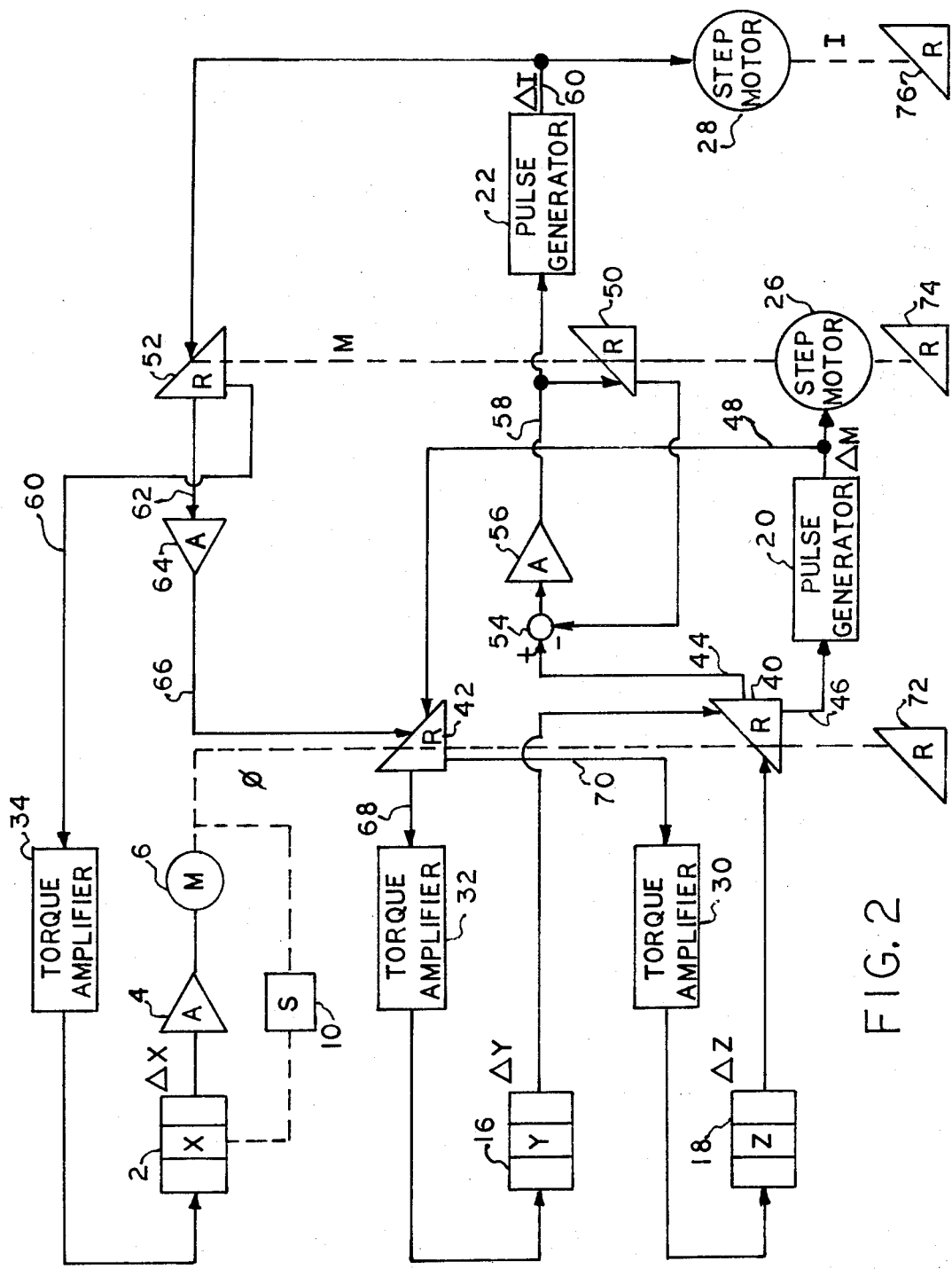
FIG. 2 is a more detailed schematic diagram of the three-gimbal strapped-down system.

FIG. 2 is a more detailed diagram of a three-gimbal system. The matrix equations which follow show the resolver transformations used in the three-gimbal system. The equation for the gyroscope-to-gimbal-angle transformation is as follows;

$$\begin{vmatrix} \Delta I \\ \Delta M \\ \Delta \phi \end{vmatrix} = \begin{vmatrix} 0 & \sec M \sin \phi & \sec M \cos \phi \\ 0 & \cos \phi & -\sin \phi \\ 1 & \tan M \sin \phi & \tan M \cos \phi \end{vmatrix} \cdot \begin{vmatrix} \Delta X \\ \Delta Y \\ \Delta Z \end{vmatrix} \quad \text{(Eqn. 1)}$$

in which $\Delta I$ is the change in the inner gimbal angle, which is nominally along the $Z$ axis of the body, $\Delta M$ is the change in the middle gimbal angle, which is nominally along the $Y$ axis of the body, $\Delta \phi$ is the change in the outer gimbal angle, which is nominally along the $X$ axis of the body, $\Delta X$ is the change in angle of the $X$ gyroscope, $\Delta Y$ is the change in the angle of the $Y$ gyroscope, and $\Delta Z$ is the change in the angle of the $Z$ gyroscope.

The equation for the gimbal-angle-to-gyroscope torquing signal transformation is as follows:

$$\begin{vmatrix} \Delta X \\ \Delta Y \\ \Delta Z \end{vmatrix} = \begin{vmatrix} -\sin M & 0 & 1 \\ \cos M \sin \phi & \cos \phi & 0 \\ \cos M \cos \phi & -\sin \phi & 0 \end{vmatrix} \cdot \begin{vmatrix} \Delta I \\ \Delta M \\ \Delta \phi \end{vmatrix} \quad \text{(Eqn. 2)}$$

Referring again to FIG. 2, the motor 6 of the single-axis platform drives a $\phi$ shaft to control the movement of forward $\phi$ resolver 40 and feedback $\phi$ resolver 42.

As can be derived from equation 1 above, when considering only the $\Delta X$ movement (i.e. assuming that no movement affects the $Y$ gyroscope or the $Z$ gyroscope) the $\phi$ movement is given by $$\Delta \phi = \Delta X \qquad \text{(Eqn 3)}$$

which is the equation mechanized by the single-axis platform. The full equation, $$\Delta \phi = \Delta X + \tan M \sin \phi \, \Delta Y + \tan M \cos \phi \, \Delta Z \quad \text{(Eqn 4)}$$

taking $\Delta Y$ and $\Delta Z$ into account, requires the action of the feedback loop on the $X$ gyroscope 2 for mechanization, as is seen below.

The $\Delta Y$ signal from $Y$ gyroscope 16 and the $\Delta Z$ signal from $Z$ gyroscope 18 are applied to the forward $\phi$ resolver to derive on line 44 a signal $\Delta Y \sin\phi + \Delta Z \cos\phi$ and to derive on line 46 a signal $\Delta Y \cos\phi - \Delta Z \sin\phi$.

Since $\Delta M$ can be shown to be given by equation $$\Delta M = \Delta Y \cos\phi - \Delta Z \sin\phi, \qquad \text{(Eqn 5)}$$

the signal on line 46 represents $\Delta M$ and is applied to a threshold detector and pulse generator 20 to derive $\Delta M$ pulses on line 48 to drive a stepping motor 26 through an angle $M$ to drive a forward $M$ resolver 50 and a feedback $M$ resolver 52.

The signal on line 44 represents $\Delta Y \sin\phi + \Delta Z \cos\phi$ and is applied to a summing junction 54 at the input of an amplifier 56. By applying the amplified signal on line 58 through forward $M$ resolver 50 back to the summing junction 54 in a negative sense, the signal on line 44 is divided by $\cos M$ to generate on line 58 a signal $\Delta Y \sin\phi + \Delta Z \cos\phi/\cos M$ or $\Delta Y \sin\phi \sec M + \Delta Z \cos\phi \sec M$. It has already been seen that $$\Delta I = \Delta Y \sin\phi \sec M + \Delta Z \cos\phi \sec M, \qquad \text{(Eqn 6)}$$

so when the signal on line 58 is applied to threshold detector and precision pulse generators, the output pulses on line 60 represent $\Delta I$, the change in the inner gimbal angle.

The $\Delta I$ pulses drive the stepping motor 28 and are also applied to the feedback $M$ resolver to generate output signals on lines 60 and 62. The signal on line 60 represents $\Delta I \sin M$ and is applied to the torque amplifier 34, whereby an amplified signal is derived to cage the $X$ gyroscope 2. Since $$\Delta I \sin M = \Delta Y \sin\phi \sec M \sin M + \Delta Z \cos\phi \sec M \sin M =$$
$$\Delta Y \tan M \sin\phi + \Delta Z \tan M \cos\phi, \qquad \text{(Eqn 7)}$$

the signal from torque amplifier 34 supplements the $\Delta X$ signal from the single-axis platform in caging the $X$ gyroscope and generating the resulting $\Delta \phi$ signal, where $$\Delta \phi = \Delta X + \Delta Y \tan M \sin\phi + \Delta Z \tan M \cos\phi \quad \text{(Eqn 8)}$$

Meanwhile, the signal on line 62 is amplified in amplifier 64 to produce a signal on line 66 which represents $\Delta I \cos M$, and the signal on line 66 is applied to feedback $\phi$ resolver 42. The $\Delta M$ signal on line 48 is also applied to resolver 42. Resolver 42 provides output signals on lines 68 and 70 respectively to torque amplifiers 32 and 30.

The signal from torque amplifier 32, used to cage $Y$ gyroscope 16, has a value $\Delta I \cos M \sin\phi + \Delta M \cos\phi$, which is seen to be the value of $\Delta Y$ given by equation 2. The signal from amplifier 30, used to cage $Z$ gyroscope 18, has a value $\Delta I \cos M \cos\phi - \Delta M \sin\phi$, which is seen to be the value of $\Delta Z$ given by equation 2. Thus all three gyroscopes can be caged.

Resolvers 72, 74 and 76 respectively provide output indications corresponding to gimbal angles $\phi$, $M$ and $I$.

All of the feedback resolvers act as pulse transformers and transmit a clean, somewhat rounded pulse of constant area. Such a pulse can be generated by swinging the magnetic core of a generator from saturation in one polarity to saturation in the opposite polarity. The pulse levels should be large to exceed the low-level magnetic non-linearity of the resolvers. But with large pulse levels, there is the possibility that several pulses in the same direction could saturate the resolver core. Thus provision is made for polarity switching of the pulses, plus time sequencing between the several channels.

Figure 3:
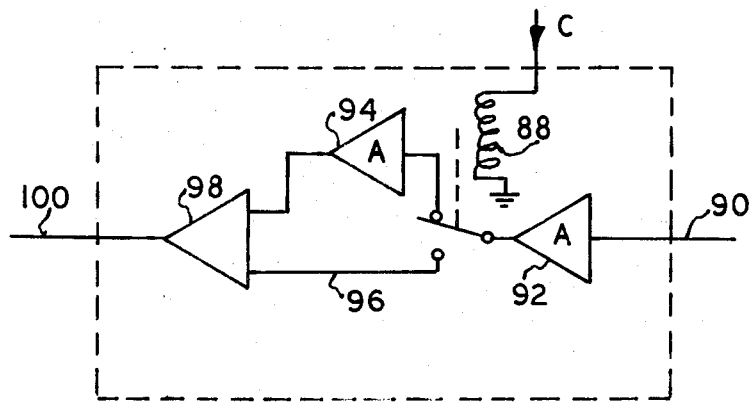
FIG. 3 is a schematic diagram of a torque amplifier used in the system of FIG. 2.
Figure 4:
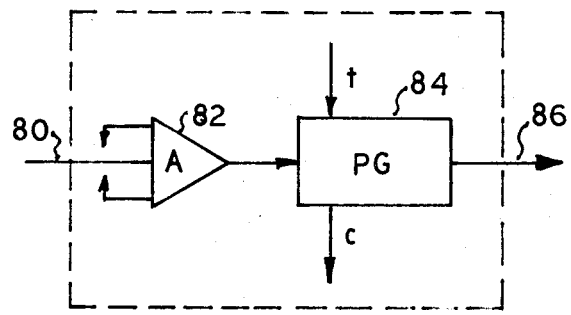
FIG. 4 is a schematic diagram of a polarity switchable threshold detector and pulse generator used in the system of FIG. 2.

FIG. 3 is a diagram of a torque amplifier and FIG. 4 is a diagram of a pulse generator, both of which can be used in a polarity switching system. The pulse generator receives an input signal on line 80 for application to an amplifier having a transfer function switchable between +1 and −1. The amplifier output is applied to a pulse generator which is periodically switched by a timing signal t to provide alternating output pulses on line 86. The pulse generator also provides a switching pulse c, which is applied to a relay coil 88 or its solid-state equivalent, as shown in FIG. 3. The input to the polarity-switchable amplifier system on line 90 is applied to an inverter amplifier 92. The relay switches the amplifier output alternately between the input of a second inverter amplifier 94 and a direct line 96, both of which feed a torque amplifier 98 to provide a torsion-control output on line 100. Thus the torsion amplifier system demodulates the polarity switching introduced by the pulse generator polarity modulation.

Figure 5:
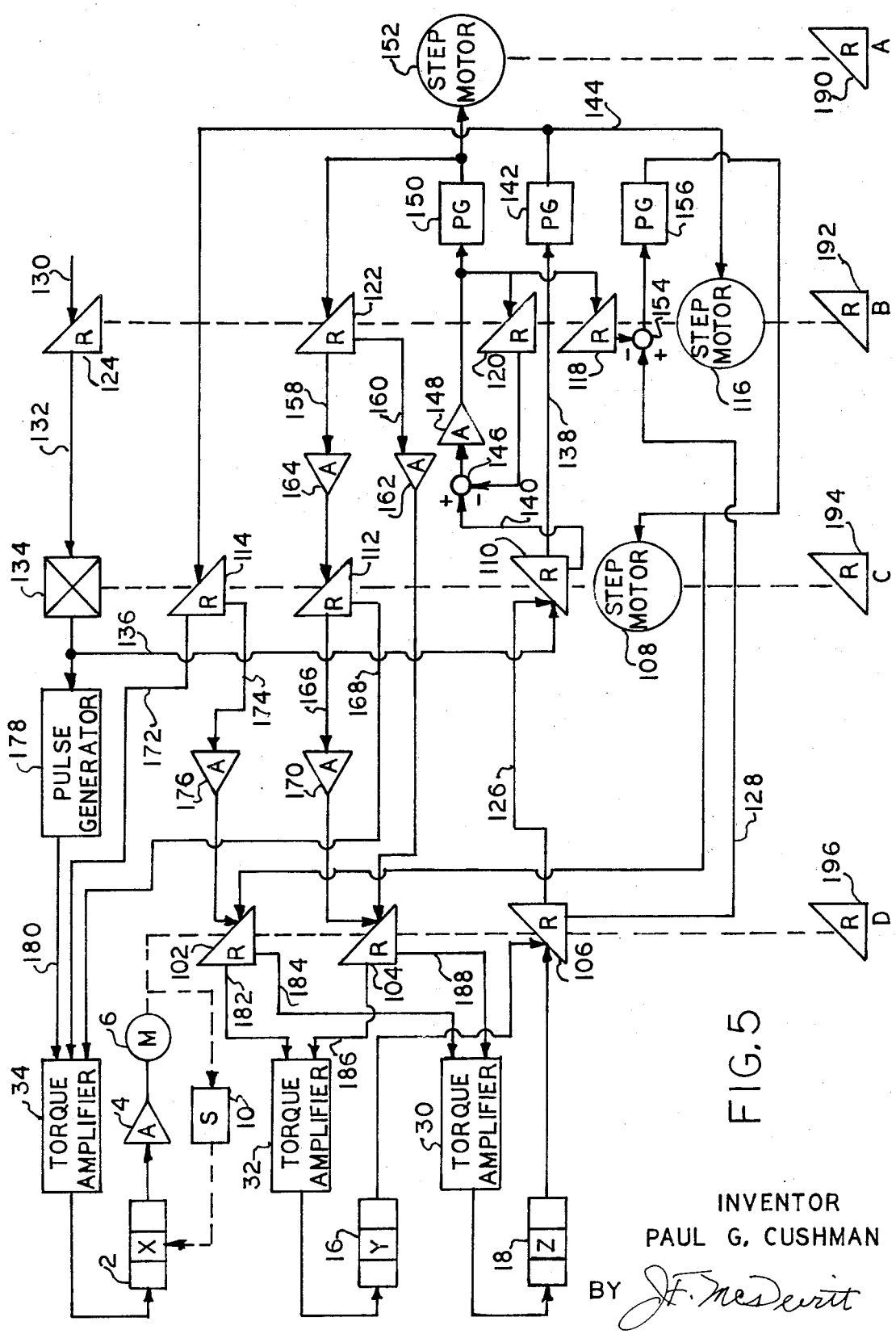
FIG. 5 is a schematic diagram of a equivalent four-gimbal strapped-down system.

Because three-gimbal systems are subject to gimbal lock for some combinations of body motion, the embodiment of FIG. 5 is a four-gimbal system, which is considerably more complex than a three-gimbal system, but which allows greater freedom of body motion.

In a four-gimbal system having an outer gimbal angle D, a next-to-outer gimbal angle C, a next-to-inner gimbal angle B, and an inner gimbal angle A, the gyroscope-to-gimbal-angle matrix conversion equation is as follows:

$$\begin{vmatrix} \Delta A \\ \Delta B \\ \Delta C \end{vmatrix} = \begin{vmatrix} \dfrac{-\sin C}{\cos B} & \dfrac{\cos C \sin D}{\cos B} & \dfrac{\cos C \cos D}{\cos B} \\ \cos C & \sin C \sin D & \sin C \cos D \\ \dfrac{\sin B \sin C}{\cos B} & \left[\cos D \dfrac{-\sin B \cos C \sin D}{\cos B}\right] & \left[-\sin D \dfrac{-\sin B \cos C \cos D}{\cos B}\right] \end{vmatrix} \cdot \begin{vmatrix} \Delta X \\ \Delta Y \\ \Delta Z \end{vmatrix} \quad \text{(Eqn. 9)}$$

The redundant gimbal angle is given by $$\Delta D = [\text{SIGNF} (\cos C) \sin B \qquad \text{(Eqn. 10)}.$$

The gimbal-angle-to-gyroscope-torquing matrix transform equation is as follows:

$$\begin{vmatrix} \Delta X \\ \Delta Y \\ \Delta Z \end{vmatrix} = \begin{vmatrix} -\cos B \sin C & \cos C & 0 & 1 \\ \sin B \cos D + \cos B \cos C \sin D & \sin C \sin D & \cos D & 0 \\ -\sin B \sin D + \cos B \cos C \cos D & \sin C \cos D & -\sin D & \end{vmatrix} \cdot \begin{vmatrix} \Delta A \\ \Delta B \\ \Delta C \\ \Delta D \end{vmatrix} \quad \text{(Eqn. 11)}$$

In FIG. 5, as in FIG. 3, motor 6 of the single-axis platform controls the resolvers for the outer gimbal angle, in this case, angle D. Motor 6 controls feedback D resolvers 102 and 104 and forward D resolver 106.

The remaining resolver circuitry has several interrelated feedback loops, and can be understood only as a computer system rather than a sequential series of paths.

A stepping motor 108 drives C resolvers 110, 112 and 114. A stepping motor 116 drives resolvers 118, 120, 122 and 124.

The Y gyroscope 16 provides a $\Delta Y$ error signal and the Z gyroscope generates a $\Delta Z$ error signal, both of which are applied to resolver 106. Resolver 106 provides output signals on two lines 126 and 128. The signal on line 126 is $\Delta Y \sin D + \Delta Z \cos D$ and the signal on line 128 is $\Delta Y \cos D + \Delta Z \sin D$.

A constant signal on line 130 is applied to resolver 124 to generate a signal corresponding to $\cos B$ on line 132. Switch 134 switches the signal on line 132 according to the sign of the $\cos C$ value to provide a $\Delta X^*$ signal on line 136.

The signals from lines 126 and 136 are applied to resolver 110 to derive output signals on lines 138 and 140. The signal on line 138 has a value $$\Delta X^* \cos C + \sin C (\Delta Y \sin D + \Delta Z \cos D)$$

and is applied to precision pulse generator 142 to generate $\Delta B$ pulses on line 144. The $\Delta B$ pulses are applied to drive stepping motor 116.

The signal on line 140 has a value $\Delta X \sin C - \cos C (\Delta Y \sin D + \Delta Z \cos D)$ and is applied in a positive manner to a summing junction 146. The summing junction output signal is amplified in amplifier 148 and fed back through resolver 120 to the summing junction in a negative manner. The the output from amplifier 148 has a value $$\Delta X^* \sin C - \cos C (\Delta Y \sin D + \Delta Z \cos D)/\cos B$$

and is applied to a precision pulse generator 150 to generate $\Delta A$ pulses. These $\Delta A$ pulses are applied to a stepping motor 152 and to a resolver 122. The output from amplifier 148 is also applied to resolver 118 to generate an output signal having a value $-\tan B (\Delta X^* \sin C - \cos C [\Delta Y \sin D + \Delta Z \cos D])$ for application to a summing junction 154 in a negative manner. The signal on line 128 corresponds to $\Delta Y \cos D - \Delta Z \sin D$ and is applied to junction 154 in a positive manner. The summed signal is applied to a pulse generator 156 to generate $\Delta C$ pulses for application to stepping motor 108 and for application to resolver 102.

Resolver 122 receives the $\Delta A$ pulses and generates output signals on lines 158 and 160. The signal on line 160, having a value $\Delta A \sin B$, is applied through amplifier 162 to resolver 104. The signal on line 158, having a value $\Delta A \cos B$, is applied through amplifier 164 to resolver 112. Resolver 112 produces output signals on lines 166 and 168. The signal on line 168, having a value $- \Delta A \sin C \cos B$, is applied to an input of torque amplifier 34. The signal on line 166, having a value $\Delta A \cos B \cos C$ is applied through amplifier 170 to resolver 104.

The $\Delta B$ pulses to resolver 114 produces output signals on lines 172 and 174. The signal on line 172, having a value $\Delta B \cos C$, is applied to an input of torque amplifier 34. The signal on line 174, having a value $\Delta B \sin C$, is applied to an input of resolver 102 through an amplifier 176.

The $\Delta X^*$ signal on line 136 is applied to precision pulse generator 178 to generate $\Delta D$ pulses on line 180 for application to torque amplifier 34. Torque amplifier 34 sums the signals from lines 180, 172, and 168 to derive a caging signal for the X gyroscope 2.

Resolver 102 produces output signals on lines 182 and 184. The signal on line 182, having a value $\Delta B \sin C \sin D + \Delta C \cos D$, for application to an input of torque amplifier 32. The signal on line 184, having a value $\Delta B \sin C \cos D - \Delta C \sin D$, is applied to a second input of torque amplifier 30. Torque amplifier 32 sums the signals from lines 182 and 186 to derive a caging signal for the Y gyroscope 16. Torque amplifier 30 sums the signals from lines 184 and 188 to derive a caging signal for the Z gyroscope 18.

Resolvers 190, 192, 194 and 196 provide outputs respectively of the angles A, B, C and D. Although gimbal angles are referred to throughout the specification, there are obviously no actual gimbal angles in a strapped-down system, and the gimbal angles referred to are simulated values of what the gimbal angles would be if it were a gimbal system.

Although numerous types of components can be used in the preferred embodiments, the following are proposed for use in the system. The resolvers can be Kearfott type CR9 0918 001. The gyroscopes can be Honeywell type GG250 or GG334A and Kearfott type KING 2519. The precision pulse generators can be of the type used in the Bell Aerospace Corp. Model 5 digital velocity meter. The stepping motors can be high rate steppers of the type sold by A. W. Haydon Co. The torquing amplifiers can be operational amplifiers of known construction and commercially available. Likewise, the operational amplifiers are commercially available such as the Fairchild microcircuits type 709. The threshold detectors can use the same type operational amplifiers.

What is claimed as new and desired to be secured by Letters Patent of the United States is:

1. In a strapped-down inertial reference system comprising:

a. a plurality of gyroscopic means for mounting on a rotatable body to generate a corresponding plurality of body-angle rotation-measurement signals indicative of the rotation of the body about a corresponding plurality of respective axes of the body, and b. a corresponding plurality of torsion means responsive respectively to a corresponding plurality of torsion-controlling signals for caging the respective gyroscopic means to the body, the improvement comprising:

c. a first resolution means for receiving said body-angle rotation-measurement signals and generating a plurality of gimbal-angle rotation signals, d. a plurality of pulse generating means, each of which receives a respective gimbal-angle rotation signal for generating a discrete output pulse each time the respective received gimbal-angle rotation signal reaches a predetermined value, e. a second resolution means for receiving said discrete output pulses from each pulse generating means for generating said torsion controlling signals, and f. a plurality of stepping motors responsive to said discrete output pulses from said pulse generating means for driving the first and second resolution means with respect to at least two axes.

2. A system according to claim 1 further comprising a single-axis platform responsive to one of said gyroscopic means driving the first and second resolution means with respect to an additional axis.

3. In a strapped-down inertial reference system comprising:
   a. a plurality of gyroscopic means for mounting on a rotatable body to generate a corresponding plurality of body-angle rotation-measurement signals indicative of the rotation of the body about a corresponding plurality of respective axes of the body, and
   b. a corresponding plurality of torsion means responsive respectively to a corresponding plurality of torsion-controlling signals for caging the respective gyroscopic means to the body, the improvement comprising:
   c. a first resolution means for receiving said body-angle rotation-measurement signals and generating a plurality of gimbal-angle rotation signals,
   d. a plurality of pulse generating means, each of which receives a respective gimbal-angle rotation signal for generating an output pulse each time the respective received gimbal-angle rotation signal reaches a predetermined value, and
   e. a second resolution means for receiving the output pulses from each pulse generating means for generating said torsion controlling signals wherein
   there are three said gyroscopic means arranged respectively to measure the rotation of said body about $X$, $Y$ and $Z$ axes in terms of incremental angles of rotation $\Delta X$, $\Delta Y$, $\Delta Z$,
   said body-angle rotation-measurement signals are three gimbal-angle signals measured respectively in terms of incremental angles $\Delta \phi$, $\Delta M$, and $\Delta I$,,
   said first resolution means derives the incremental gimbal-angle rotation signals from incremental angles of rotation according to the equation $$\begin{vmatrix} \Delta I \\ \Delta M \\ \Delta \phi \end{vmatrix} = \begin{vmatrix} 0 & \sec M \sin \phi & \sec M \cos \phi \\ 0 & \cos \phi & -\sin \phi \\ 1 & \tan M \sin \phi & \tan M \cos \phi \end{vmatrix} \cdot \begin{vmatrix} \Delta X \\ \Delta Y \\ \Delta Z \end{vmatrix}$$

and,
   said second resolution means derives torsion-controlling signals corresponding to the incremental angles of rotation according to the equation $$\begin{vmatrix} \Delta X \\ \Delta Y \\ \Delta Z \end{vmatrix} = \begin{vmatrix} -\sin M & 0 & 1 \\ \cos M \sin \phi & \cos \phi & 0 \\ \cos M \cos \phi & -\sin \phi & 0 \end{vmatrix} \cdot \begin{vmatrix} \Delta I \\ \Delta M \\ \Delta \phi \end{vmatrix}$$

4. A system according to claim 3 further comprising a plurality of stepping motors responsive to the output pulses from said pulse generating means and driving the first and second resolution means with respect to at least two axes.

5. A system according to claim 4 further comprising a single-axis platform responsive to one of said gyroscopic means driving the first and second resolution means with respect to an additional axis.

6. In a strapped-down inertial reference system comprising:
   a. a plurality of gyroscopic means for mounting on a rotatable body to generate a corresponding plurality of body-angle rotation-measurement signals indicative of the rotation of the body about a corresponding plurality of respective axes of the body, and
   b. a corresponding plurality of torsion means responsive respectively to a corresponding plurality of torsion-controlling signals for caging the respective gyroscopic means to the body, the improvement comprising:
   c. a first resolution means for receiving said body-angle rotation-measurement signals and generating a plurality of gimbal-angle rotation signals,
   d. a plurality of pulse generating means, each of which receives a respective gimbal-angle rotation signal for generating an output pulse each time the respective received gimbal-angle rotation signal reaches a predetermined value, and
   e. a second resolution means for receiving the output pulses from each pulse generating means for generating said torsion controlling signals wherein
   there are three said gyroscopic means arranged respectively to measure the rotation of said body about $X$, $Y$ and $Z$ axes in terms of incremental angles of rotation $\Delta X$, $\Delta Y$ and $\Delta Z$,
   said body-angle rotation-measurement signals are four gimbal-angle signals measured respectively in terms of incremental angles $\Delta A$, $\Delta B$, $\Delta C$, and $\Delta D$, where $\Delta D$ is a redundant incremental angle,
   said first resolution means derives incremental gimbal-angle rotation signals from incremental angles of rotation according to the equations $$\begin{vmatrix} \Delta A \\ \Delta B \\ \Delta C \end{vmatrix} = \begin{vmatrix} \dfrac{-\sin C}{\cos B} & \dfrac{\cos C \sin D}{\cos B} & \dfrac{\cos C \cos D}{\cos B} \\ \cos C & \sin C \sin D & \sin C \cos D \\ \dfrac{\sin B \sin C}{\cos B} & \left[\cos D - \dfrac{\sin B \cos C \sin D}{\cos B}\right] & \left[-\sin D - \dfrac{\sin B \cos C \cos D}{\cos B}\right] \end{vmatrix} \cdot \begin{vmatrix} \Delta X \\ \Delta Y \\ \Delta Z \end{vmatrix}$$

and $$\Delta D = [\text{SIGNF} (\cos C)] \sin B,$$

and
   said second resolution means derives torsion controlling signals corresponding to the incremental angles of rotation according to the equation $$\begin{vmatrix} \Delta X \\ \Delta Y \\ \Delta Z \end{vmatrix} = \begin{vmatrix} -\cos B \sin C & \cos C & 0 & 1 \\ \sin B \cos D + \cos B \cos C \sin D & \sin C \sin D & \cos D & 0 \\ -\sin B \sin D + \cos B \cos C \cos D & \sin C \cos D & -\sin D & 0 \end{vmatrix} \cdot \begin{vmatrix} \Delta A \\ \Delta B \\ \Delta C \\ \Delta D \end{vmatrix}$$

7. A system according to claim 6 further comprising a plurality of stepping motors responsive to the output pulses from said pulse generating means and driving the first and second resolution means with respect to at least two axes.

* * * * *

UNITED STATES PATENT OFFICE
CERTIFICATE OF CORRECTION

Patent No.     3,694,631     Dated    September 26, 1972

Inventor(s)     Paul G. Cushman

It is certified that error appears in the above-identified patent and that said Letters Patent are hereby corrected as shown below:

Title, delete "TWO-RESOLVER" and insert -- TWO-RESOLUTION --.

Signed and sealed this 13th day of March 1973.

(SEAL)
Attest:

EDWARD M. FLETCHER, JR.
Attesting Officer

ROBERT GOTTSCHALK
Commissioner of Patents